(12) United States Patent
Yen et al.

(10) Patent No.: US 9,207,968 B2
(45) Date of Patent: Dec. 8, 2015

(54) COMPUTING SYSTEM USING SINGLE OPERATING SYSTEM TO PROVIDE NORMAL SECURITY SERVICES AND HIGH SECURITY SERVICES, AND METHODS THEREOF

(75) Inventors: Hsien-Chun Yen, Tai-Chung Hsien (TW); Jing-Kuang Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 1013 days.

(21) Appl. No.: 12/611,223

(22) Filed: Nov. 3, 2009

(65) Prior Publication Data

US 2011/0107426 A1    May 5, 2011

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G06F 7/04 | (2006.01) |
| G06F 17/30 | (2006.01) |
| H04N 7/16 | (2011.01) |
| G06F 9/46 | (2006.01) |
| G06F 21/53 | (2013.01) |
| G06F 9/48 | (2006.01) |

(52) U.S. Cl.
CPC .............. *G06F 9/468* (2013.01); *G06F 9/4812* (2013.01); *G06F 21/53* (2013.01); *G06F 9/4843* (2013.01); *G06F 2221/2105* (2013.01)

(58) Field of Classification Search
CPC ................................ G06F 21/53; G06F 9/4843
USPC ......................................................... 726/23
See application file for complete search history.

(56) References Cited

U.S. PATENT DOCUMENTS

| | | | | |
|---|---|---|---|---|
| 7,730,544 | B2* | 6/2010 | Volp | 726/27 |
| 2003/0115245 | A1* | 6/2003 | Fujisawa | 709/107 |
| 2004/0139346 | A1* | 7/2004 | Watt et al. | 713/200 |
| 2005/0081020 | A1 | 4/2005 | Volp | |
| 2005/0097252 | A1* | 5/2005 | Kelley et al. | 710/200 |
| 2008/0092145 | A1 | 4/2008 | Sun et al. | |
| 2009/0031396 | A1* | 1/2009 | Jung et al. | 726/1 |

OTHER PUBLICATIONS

ARM Security Technology: "Building a Secure System using TrustZone Technology", Retrieved from the Internet: URL: http://infocenter.arm.com/help/topic/com.arm.don.prd29-genc-009492C_trustzone_security_whitepaper.pdf [retrieved on May 20, 2011], Apr. 2009; pp. 1-108.

* cited by examiner

*Primary Examiner* — Ashok Patel
*Assistant Examiner* — Lawrence Cosby
(74) *Attorney, Agent, or Firm* — McClure, Qualey & Rodack, LLP (57) ABSTRACT

A method of providing normal security services and high security services with a single operating system in a computing system is disclosed. A secure thread is only accessible while the computing system is in a high security environment, and relates to one of the high security services. A pseudo normal thread is to be executed while the computing system in a normal security environment, and it works as a temporary of the secure thread, and is forwarded to a thread ordering service to gain access to resources of the computing system. When the pseudo normal thread gains access to the computing system resources, the computing system is changed to the high security environment to execute the secure thread.

20 Claims, 6 Drawing Sheets

COMPUTING SYSTEM USING SINGLE OPERATING SYSTEM TO PROVIDE NORMAL SECURITY SERVICES AND HIGH SECURITY SERVICES, AND METHODS THEREOF

BACKGROUND OF THE INVENTION

1. Field of the Invention

The present invention relates to computing systems providing normal security services and high security services with a single operating system.

2. Description of the Related Art

Processors with 32-bit reduced instruction set computer (RISC) instruction set architecture (ISA) are relative simple compared to processor used in desktop personal computer, thus are suitable for consumer electronics such as mobile phones, PDAs, digital camera, digital media and music players, handheld game consoles, and computer peripherals such as hard drives and routers. These processors dominate in the mobile and embedded electronics market as they are relatively low cost and consume lower power. The ARM architecture is the most widely used 32-bit ISA, and ARM processors are the most popular embedded 32-bit RISC processors nowadays.

Applications executed by consumer electronics may require services of different security levels. Normal security services, such as making a phone call and playing java games may operate well in a normal security environment (Normal world). However, when high security services such as online credit card payment are requested, the normal security environment may not satisfy the security requirements. A separate high security environment (Secure world) is required to handle such high security services in order to prevent information leaking.

The TrustZone hardware architecture, developed by ARM, aims to execute code from both the Normal world and the Secure world with a single physical processor core. The single physical processor has the benefits of smaller silicon area, low cost, and low power consumption comparing to two dedicated processors. The application core switches between the Normal world and Secure world in a time-sliced fashion, and this world switch is generally orthogonal to all other capabilities of the process and so each world can operate independently of the other while using the same core.

Examples of software architectures implementing a Secure world stack on a TrustZone-enabled processor core include dedicated Secure world operating system (OS) and synchronous library. A dedicated Secure world OS is a complex yet powerful design. It can simulate concurrent execution of multiple independent Secure world applications, run-time download of new security applications, and Secure world tasks. On the other hand, the simple synchronous library of code placed in the Secure world handles only one task at a time, and the task is uninterruptible. Users may experience termination or disable of normal security applications such as music playback and phone call or message reception.

BRIEF SUMMARY OF THE INVENTION

The invention discloses computing systems using a single operating system to provide normal security services and high security services, in particular, the high security services are interruptible and the computer systems support multiple thread computing in the Secure world. An exemplary embodiment of the computing system comprises a secure application programming interface (secure API), a driver layer, and a monitor (may be implemented by software applications). The secure API is invoked by a pseudo normal thread executed while the computing system is in a normal security environment. The driver layer is invoked by the secure API to operate a world switch instruction. The world switch instruction activates the monitor to save context of the pseudo normal thread, change the computing system to a high security environment, check a thread mapping table storing a relation between the pseudo normal thread and a secure thread to obtain the secure thread, create or restore context of the secure thread, and dispatch the secure thread to be executed by the computing system that has been changed to the high security environment. The secure thread relates to one of the high security services.

The invention further discloses methods for using a single operating system (OS) in a computing system to provide normal security services and high security services. In an exemplary embodiment of the method, a secure thread and a pseudo normal thread are provided. The secure thread is limited to be executed while the computing system is in a high security environment, and relates to the high security services. The pseudo normal thread is to be executed while the computing system is in a normal security environment, and it works as a temporary of the secure thread, and is forwarded to a thread ordering service to gain access to resources of the computing system. When the pseudo normal thread gains access to the resources of the computing system, the computing system is changed to the high security environment to execute the secure thread. Thus, the high security service of the secure thread can be safely performed.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
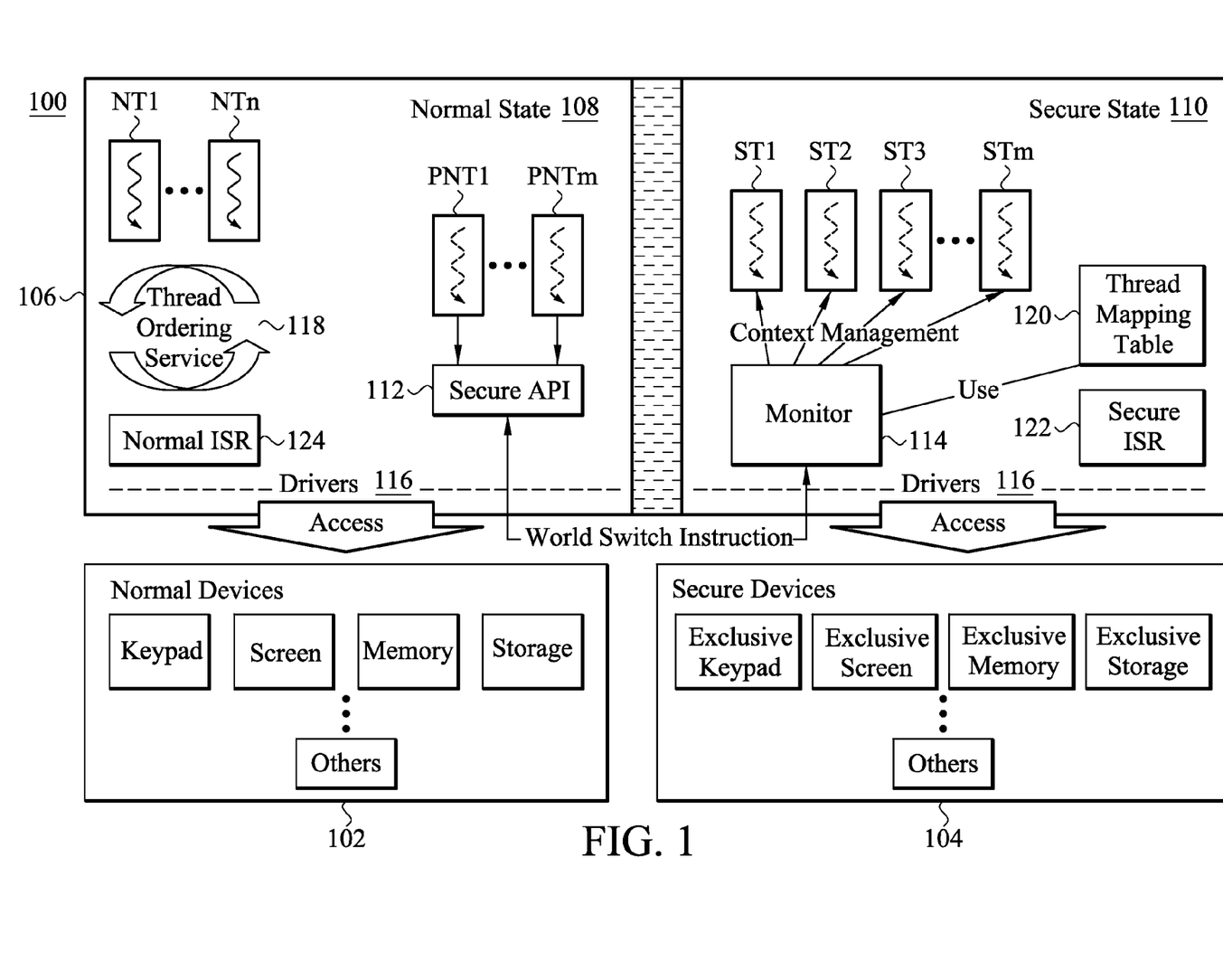
FIG. 1 depicts an embodiment of a computing system 100 capable of executing codes from the normal security environment and the high security environment with a single physical processor.

FIG. 1 depicts a computing system 100 in accordance with an embodiment of the invention. The computing system 100 comprises normal devices 102, secure devices 104, and an operating core 106. In some embodiments, certain devices are used in both normal state 108 and secure state 110, for example, the keypad in the normal devices 102 and the exclusive keypad in the secure devices 104 are actually the same keypad. Some other devices or part of the devices are dedicated for executing codes in the secure state 110, for example, a particular portion of a memory is only accessible in the secure state 110. According to the registers and kernel of the computing system 100, the operating core 106 may be switched between the normal state 108 and the secure state 110. The security level and security requirement of the secure state 110 are much higher than that of the normal state 108. The normal devices 102 are accessed by the operating core 106 in the normal state 108, to form a normal security environment (Normal world) for normal security services. The secure devices 104 are accessed by the operating core in the secure state 110, to form a high security environment (Secure world) for high security services. Note that access to some of the dedicated secure devices 104 is prohibited when the operating core 106 is in the normal state 108 to isolate sensitive data in the high security environment and prevent information leaking from the high security environment to the normal security environment. When high security services are requested, the operating core 106 is switched to the secure state 110 to safely access the secure devices 104 and process the sensitive data. The high security environment is isolated from hackers and backdoor programs, or any malicious programs.

To switch the operating core 106 between the normal state 108 and the secure state 110, a secure application program interface (secure API) 112 and a monitor 114 (may be implemented by a software application) are utilized, and some alterations are made in the design of the driver layer (drivers 116) and the operating system (OS) of the computing system 100. In this embodiment, only one OS is applied in the computing system 100. Three kinds of threads, including normal threads NT1 . . . NTn, secure threads ST1 . . . STm and pseudo normal threads PNT1 . . . PNTm, are provided in the OS. Each of the threads refers to a context depicting an execution environment and condition of the computing system 100. When a particular service of a thread is complete or interrupted, the context of the thread will be stored. Once again it gains resource by scheduling, the context of the thread will be restored, means that the environment of the computing system will be restored to resume the execution. A context may contain a stack, a register set, a program counter (PC), a pointer, a virtual memory, and so on. Storing or restoring a context may contain storing the context into the process stack, such as storing register values (e.g. program counter, link register, or stack pointer) related to the context of the thread. The normal threads NT1 . . . NTn are used to execute normal security services when the operating core 106 is in the normal state 108 (the computing system 100 is in the normal security environment). The secure threads ST1 . . . STm are limited within the secure world (when the operating core 106 is in the secure state 110) for executing high security services. The secure threads ST1 . . . STm are only operational in the high secure environment and are not accessible when the operating core 106 is in the normal state 108, hence the pseudo normal threads PNT1 . . . PNTm having a one-to-one relation with the secure threads ST1 . . . STm) are provided to be executed in the normal security environment to work as temporaries of the secure threads ST1 . . . STm. The pseudo normal thread is acting like a substitute of the corresponding secure thread, and the pseudo normal thread exists in the normal world to gain resources for the corresponding secure thread through scheduling. In the normal world (the operating core 106 is in the normal state 108), the pseudo normal threads PNT1 . . . PNTm are treated as normal threads, and these pseudo normal threads are the substitute of their corresponding secure threads ST1 . . . STm to queue with the normal threads NT1 . . . NTn for the access of the resources of the computing system 100. As shown, the thread ordering service 118 of the OS takes charge of the resource allocation. When any of the pseudo normal thread gains access to the resources of the computing system 100, the operating core 106 is switched to the secure state 110 to execute the corresponding secure thread. Thus, the computing system 100 can provide both normal security services and high security services with a single OS, and the high security services are interruptible and with multi-tasking capabilities.

In some embodiments, the relationship of pseudo normal threads and the secure threads may be stored in a tread mapping table 120, and in some other embodiments, the secure thread ID can be derived by the pseudo normal thread ID or vise versa. An exemplary implementation of mapping a pseudo normal thread to a secure thread is letting the pseudo normal thread to be normal world thread identification (ID), such as the process ID in Linux system, and letting the secure thread to be a number derived by the corresponding pseudo normal thread ID. For example, the secure thread ID is the corresponding pseudo normal thread ID plus a predefined number.

The secure API 112 is designed for high security services. As shown in FIG. 1, the winning pseudo normal thread (one of the pseudo normal threads PNT1 . . . PNTm that gains access to the resources of the computing system 100 in the thread ordering service 118) calls the secure API 112 to switch the state of the operating core 106 via the driver layer (drivers 116). In the driver layer (116), a world switch instruction such as a Secure Monitor Call (SMC) is called to activate the monitor 114. The activated monitor 114 saves context of the winning pseudo normal thread, for example, modifies registers and kernels of the computing system 100 to change the computing system 100 to the high secure environment, checks the thread mapping table 120 storing the relation between the pseudo normal threads PNT1 . . . PNTm and the secure threads ST1 . . . STm to obtain the corresponding secure thread, restores context of the obtained secure thread, and dispatches the obtained secure thread to be executed. The high security service of the secure thread is performed by the computing system 100 that has been changed to the high security environment. The forgoing 'context saving' and 'context restoring' store and restore information used in resuming the thread. When one thread is paused to switch to another thread, the context of the paused thread is saved in the stack of the current process (for example, the program counter, link register, or stack pointer about the context of the paused thread are stored to the stack of the current process). By restoring the information in the stack of the current process, the context of the paused thread is rebuilt and the paused thread is resumed.

Figure 2:
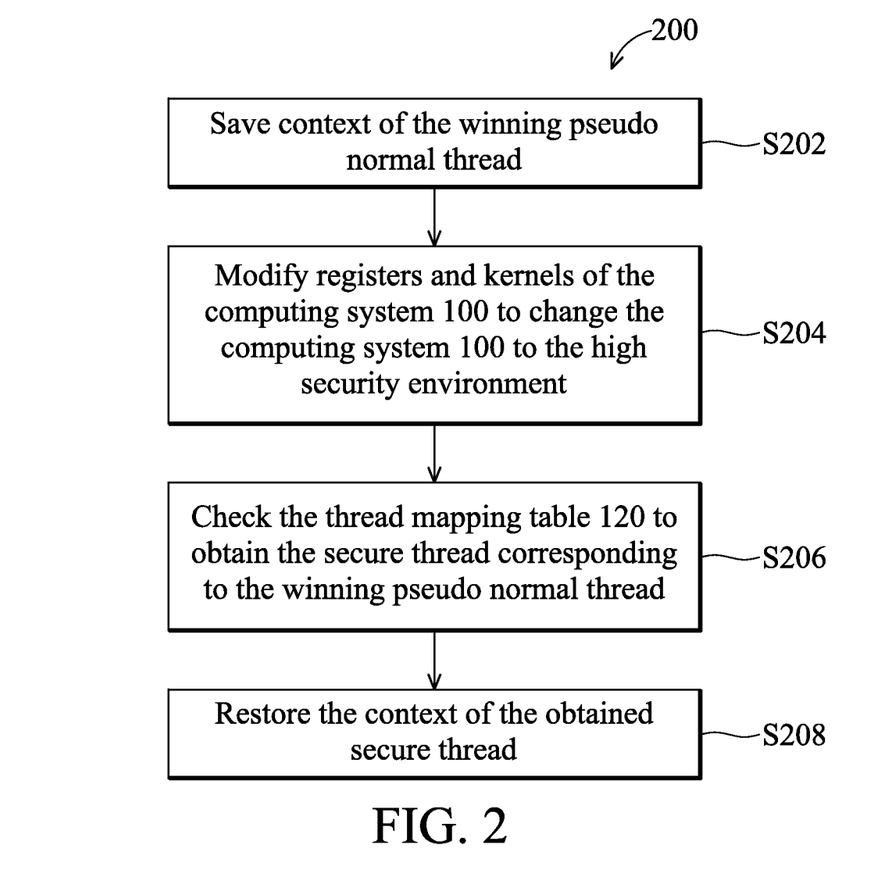
FIG. 2 is an embodiment of a flowchart demonstrating the method of switching from the normal security environment to the high security environment.
Figure 3:
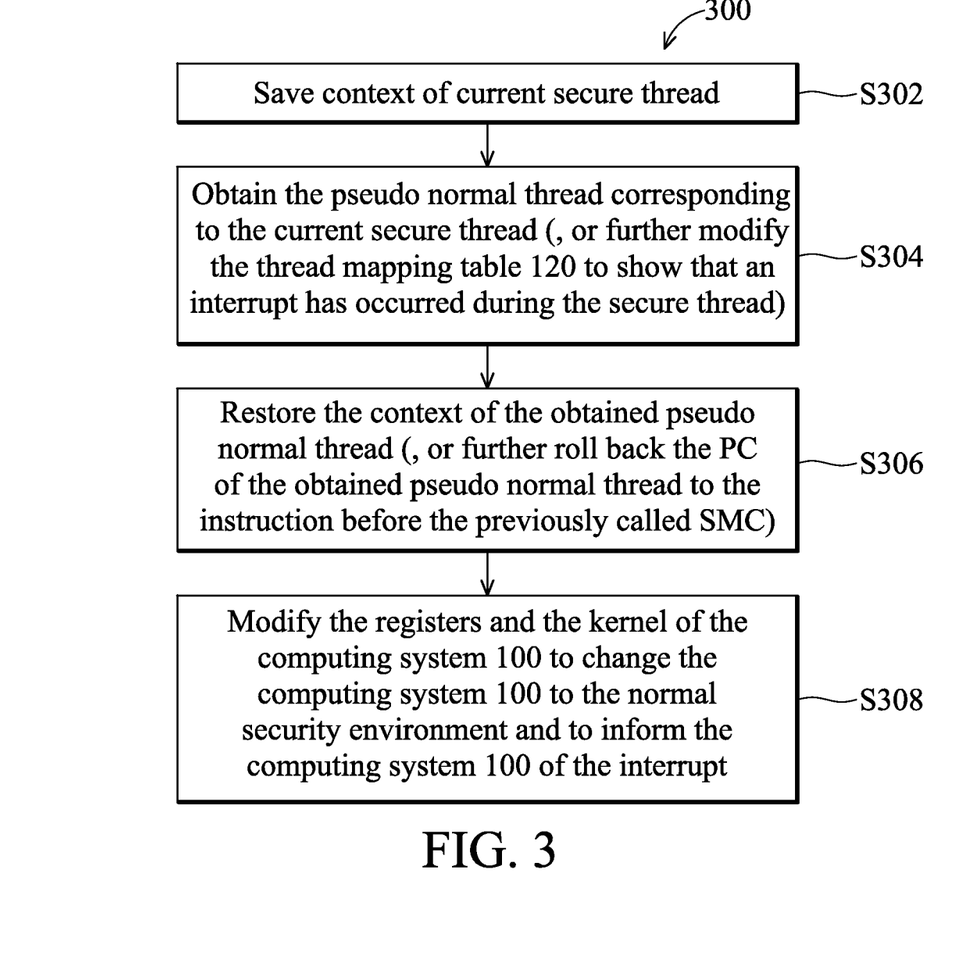
FIG. 3 is an embodiment of a flowchart demonstrating the method of handling an interrupt occurring while the computing system is in the high security environment.
Figure 4:
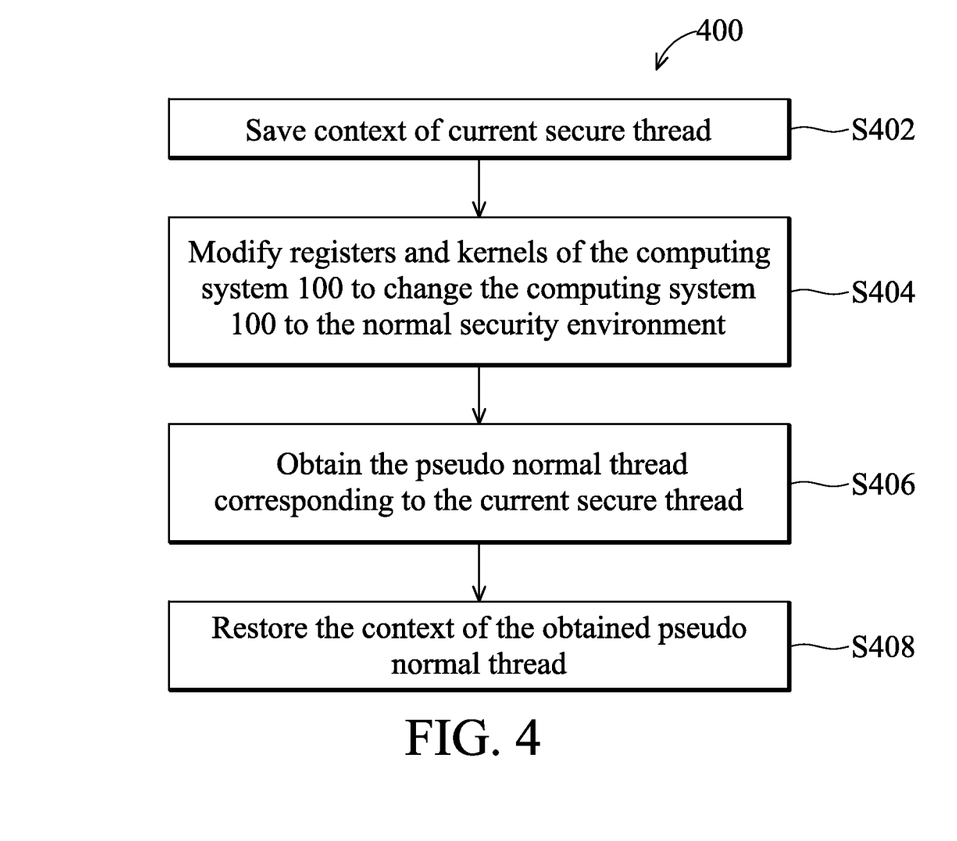
FIG. 4 is an embodiment of a flowchart depicting the method of switching from the high security environment to the normal security environment.

The operational OS allows multi-tasking and interrupt for the secure threads ST1 . . . STm. The pseudo normal threads PNT1 . . . PNTm, representing the secure threads ST1 . . . STm to participate in the thread ordering service 118, allow the multi-tasking of the secure threads ST1 . . . STm. As for the interruptible capability, a secure interrupt handler is provided in the monitor 114, or, in other embodiments, a secure interrupt service routine (secure ISR) 122 is provided to substitute for the secure interrupt handler designed in the monitor 114. Furthermore, the monitor 114 provides another function, switching the computing system 100 from the high security environment to the normal security environment at the end of each secure thread. FIGS. 2-4 show several flowcharts depicting different functions of the monitor 114.

FIG. 2 is a flowchart of switching the computing system 100 from the normal security environment to the high security environment when entering the monitor mode. The flow 200 begins by saving context of the winning pseudo normal thread (step S202). In step S204, registers and kernels of the computing system 100 are modified to change the computing system 100 to the high security environment. In step S206, the monitor 114 checks the thread mapping table 120 to obtain the secure thread corresponding to the winning pseudo normal thread. In a case wherein the wining pseudo normal thread and the corresponding secure thread are newly generated, the monitor 114 registers their relation in the thread mapping table 120. In step S208, the monitor 114 creates or restores the context of the obtained secure thread. After the steps of flow 200, the obtained secure thread is dispatched to be executed by the computing system 100 that has been changed to the high security environment.

Referring to step S204, the kernel modification of the computing system 100 may involve a supervisor mode switch while the computing system 100 uses an ARM architecture.

Referring to step S206, it may not only check the thread mapping table 120 for the corresponding secure thread, it may further check the status of the corresponding secure thread. For example, the thread mapping table 120 may further show whether the obtained secure state has been interrupted and whether it has been resumed. The status of the secure threads may be stored in the thread mapping table 120.

FIG. 3 is a flowchart depicting steps in flow 300 for a secure interrupt handler which handles an interrupt occurring in the high security environment. The secure interrupt may be handled by the monitor 114. When an interrupt occurs while the operating core 106 is in the secure state 110, the secure interrupt handler performs step S302, saving context of the current secure thread. Then, in step S304, the secure interrupt handler obtains the pseudo normal thread corresponding to the current secure thread. In step S306, the context of the obtained pseudo normal thread is restored. In step S308, the registers and the kernels of the computing system 100 is modified, to change the computing system 100 to the normal security environment and to inform the computing system 100 of the interrupt. There are some tricks in designing the secure interrupt handler. For example, the thread mapping table 120 may be modified in step S304 to show that an interrupt has occurred during the secure thread. In another embodiment, step S306 further rolls back the program counter (PC) of the obtained pseudo normal thread to the instruction before the previously called SMC. The thread mapping table 122 modifications and the PC modification help in resuming the interrupted secure services. Furthermore, the steps in the flow 300 may be implemented as a secure ISR 122 rather than be built in the monitor 114. The secure ISR 122 has to be executed in the high security environment.

FIG. 4 is a flowchart depicting flow 400 of the monitor 114 while the monitor 114 is activated to switch the computing system 100 from the high security environment to the normal security environment at the end of each secure thread. The flow 400 begins with step S402, wherein context of a current secure thread is stored. In step S404, the registers and kernels of the computing system 100 are modified to change the computing system 100 to the normal security environment. In step S406, the monitor 114 obtains the pseudo normal thread corresponding to the current secure thread. Then, in step S408, the context of the obtained pseudo normal thread is restored. After step S408, the operating core 106 is switched back to the normal state 108 via the driver layer (116) and the computing system 100 is successfully changed to the normal security environment for normal security services.

The kernel modification of step S404 may involve a 'supervisor mode switch' while the computing system 100 uses an ARM architecture.

Figure 5:
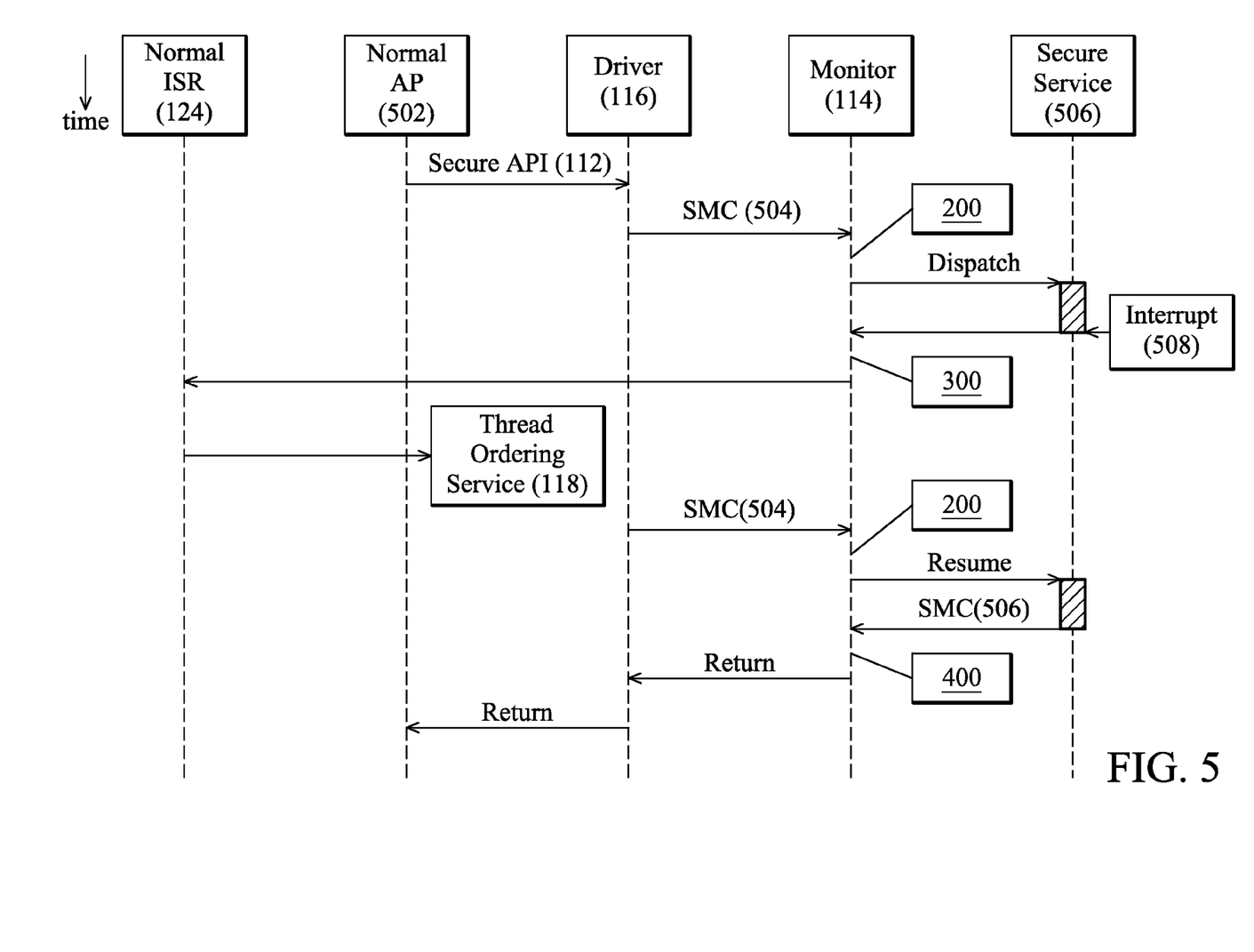
FIGS. 5 and 6 cite instances showing operations of the operating core 106 along a time axis.
Figure 6:
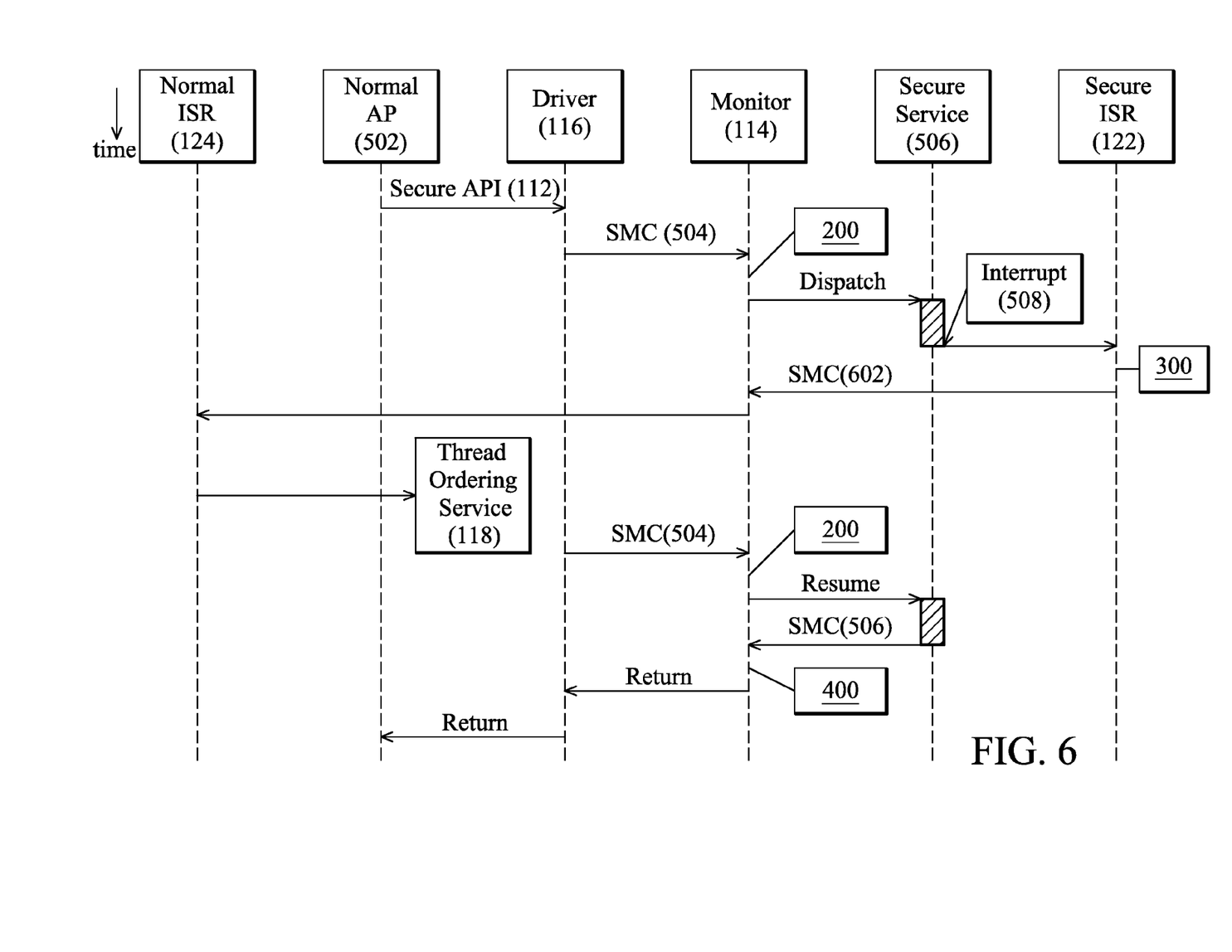

FIGS. 5 and 6 illustrate instances showing operations of the operating core 106 along a time axis. Referring to FIG. 5, the operating core 106 is originally in the normal state 108 and performing a normal application 502. When one of the pseudo normal thread PNT1 ... PNTm gains access to the resources of the computing system 100, the secure API 112 is called to invoke the driver 116 to execute an SMC 504 (an example of the world switch instruction of FIG. 1) to call the monitor 114. The monitor 114 performs steps in flow 200 and then dispatches the secure thread (obtained in flow 200) to be executed by the computing system 100 that has been changed to the high security environment, so that the secure service 506 relating to the secure thread is handled in the high security environment.

FIG. 5 further illustrates an interrupt 508 occurs before the completion of the secure service 506. The operating core 106 is forcibly returned to the monitor 114 to execute the secure interrupt handler, flow 300 shown in FIG. 3 is an example of secure interrupt handling. The monitor 114 then switches the operating core 106 back to the normal state 108 to use the normal ISR 124 to handle the interrupt 508. After the normal ISR 124, the pseudo normal thread obtained in flow 300 is forwarded to the thread ordering service 118. The thread ordering service 118 compares the priorities of the normal threads NT1 ... NTn and the pseudo normal threads PNT1 ... PNTm to schedule the resources of the computing system 100. When the pseudo normal thread (obtained in flow 300) gains access to the resources of the computing system 100 again, the SMC 504 is executed. The monitor 114 is activated again to perform the flow 200. If the thread mapping table 120 had been modified in step S304 of the flow 300, the operating core 106 is aware that the obtained secure thread had been interrupted and is called to be resumed. The rest of the secure service 506 is resumed and finished by the resumed secure thread. The secure thread ends with another SMC 506. The SMC 506 activates the monitor 114 to perform the flow 400 and the operating core 106 then returns to the normal application 502 via the driver 116.

Referring to the example of FIG. 6, the secure interrupt handler is realized by the secure ISR 122 rather than realized in the monitor 114. Thus, when the interrupt 508 occurs, the secure ISR 122 is performed by the operating core 106 to accomplish steps in flow 300. After the flow 300 is complete, the secure ISR 122 calls another SMC 602, and the operating core 106 returns to the monitor 114. Then, the monitor 114 calls the normal ISR 124 to handle the interrupt 508. The rest of FIG. 6 is similar to that in FIG. 5. In this case, because the secure interrupt handler (flow 300) is accomplished by the secure ISR 122, the code size of the monitor 114 can be small.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computing system provides normal security services and high security services with a single operating system, comprising:

normal devices and secure devices, wherein part of the secure devices are dedicated for the high security services; and a processor, building an operating core switched between a normal state and secure state via a secure application programming interface, a driver layer and a monitor, wherein:

the operating core built by the processor accesses the normal devices when being in the normal state, to form a normal security environment by the computing system for the normal security services;

the operating core built by the processor accesses the secure devices when being in the secure state, to form a high security environment by the computing system for the high security services;

the secure application programming interface is called by a pseudo normal thread executed while the computing system is in the normal security environment;

the driver layer is invoked by the secure application programming interface to call a world switch instruction;

the monitor is activated by the world switch instruction from the driver layer to save context of the pseudo normal thread, change the computing system to the high security environment, obtain a secure thread corresponding to the pseudo normal thread, create or restore context of the secure thread, and dispatch the secure thread to be executed by the computing system that has been changed to the high security environment; and the secure thread relates to one of the high security services, wherein the pseudo normal thread having a one-to-one relation with the secure thread is executed in the normal security environment to work as a temporary of the secure thread to gain resources through scheduling, the pseudo normal thread is a substitute of the corresponding secure thread to queue with other normal threads for accessing the resources.

2. The computing system as claimed in claim 1, wherein: the monitor is further activated by a world switch instruction from the high security environment to save the context of the secure thread, change the computing system to the normal security environment, obtain the pseudo normal thread, restore the context of the pseudo normal thread, and return to the normal security environment.

3. The computing system as claimed in claim 1, wherein, when an interrupt occurred while the computing system is in the high security environment, the monitor is activated to save the context of the secure thread, obtain the pseudo normal thread, restore the context of the pseudo normal thread, change the computing system to the normal security environment and inform the computing system of the interrupt, and call a normal interrupt service routine (normal ISR), working in the normal security environment, to handle the interrupt.

4. The computing system as claimed in claim 3, wherein the monitor activated by the interrupt further modifies a thread mapping table storing a relation between the pseudo normal thread and secure thread to annotate that the secure thread has been interrupted.

5. The computing system as claimed in claim 3, wherein the monitor activated by the interrupt further rolls back a program counter (PC) of the pseudo normal thread to an instruction before the called world switch instruction.

6. The computing system as claimed in claim 5, wherein the operating core in the normal state further forwards the pseudo normal thread to a thread ordering service after the normal ISR and, when the pseudo normal thread gains access to resources of the computing system in the thread ordering service, the pseudo normal thread is resumed to repeat the world switch instruction to resume the secure thread.

7. The computing system as claimed in claim 1, further comprising a secure interrupt service routine (secure ISR) working in the high security environment, wherein, when an interrupt occurs while the computing system is in the high security environment, the secure ISR is activated to save the context of the secure thread, obtain the pseudo normal thread, restore the context of the pseudo normal thread, change the computing system to the normal security environment and inform the computing system of the interrupt, and call a normal interrupt service routine (normal ISR), working in the normal security environment, to handle the interrupt.

8. The computing system as claimed in claim 7, wherein the activated secure ISR further modifies a thread mapping table storing relation between the pseudo normal thread and secure thread to annotate that the secure thread has been interrupted.

9. The computing system as claimed in claim 7, wherein the activated secure ISR further rolls back a program counter (PC) of the pseudo normal thread to an instruction before the called world switch instruction.

10. The computing system as claimed in claim 9, wherein the operating core in the normal state further forwards the pseudo normal thread to a thread ordering service after the normal ISR and, when the pseudo normal thread gains access to resources of the computing system in the thread ordering service, the pseudo normal thread is resumed to repeat the world switch instruction to resume the secure thread.

11. The computing system as claimed in claim 1, wherein the secure thread corresponding to the pseudo normal thread is obtained by checking a thread mapping table, and the thread mapping table stores relations between pseudo normal threads and secure thread.

12. A method of using a single operating system (OS) in a computing system to provide normal security services and high security services, comprising:

providing a secure thread only accessible while the computing system is in a high security environment, wherein the secure thread relates to one of the high security services;

providing a pseudo normal thread having a one-to-one relation with the secure thread to be executed while the computing system is in a normal security environment to work as a temporary of the secure thread to gain resources through scheduling, as a substitute of the corresponding secure thread to queue with other normal threads for accessing the resources;

forwarding the pseudo normal thread to a thread ordering service of the OS; and when the pseudo normal thread gains access to resources of the computing system in the thread ordering service, changing the computing system to the high security environment to execute the secure thread.

13. The method as claimed in claim 12, further comprising:

providing a secure application programming interface (secure API) for the high security services, wherein the secure API is called by the pseudo normal thread;

providing a driver layer, invoked by the secure API to call a world switch instruction to activate the step of changing the computer system from the normal security environment to the high security environment, and wherein, the step of changing the computer system from the normal security environment to the high security environment comprises:

saving context of the pseudo normal thread;

changing the computing system to the high security environment;
checking a thread mapping table storing a relation between the pseudo normal thread and the secure thread to obtain the secure thread;
creating or restoring context of the secure thread; and
dispatching the secure thread to be executed by the computing system.

14. The method as claimed in claim 13, further comprising:
executing a world switch instruction at the end of the secure thread to change the computing system from the high security environment to the normal security environment,
wherein, the step of changing the computer system from the high security environment to the normal security environment comprises:
saving the context of the secure thread;
changing the computing system to the normal security environment;
obtaining the pseudo normal thread; and
restoring the context of the pseudo normal thread.

15. The method as claimed in claim 13, further comprising the following steps when an interrupt occurs while the computing system is in the high security environment:
saving the context of the secure thread;
obtaining the pseudo normal thread;
restoring the context of the pseudo normal thread;
changing the computing system to the normal security environment and inform the computing system of the interrupt; and
calling a normal interrupt service routine (normal ISR) working in the normal security environment to handle the interrupt.

16. The method as claimed in claim 15, further modifying the thread mapping table to annotate that the secure thread has been interrupted.

17. The method as claimed in claim 15, further rolling back a program counter (PC) of the pseudo normal thread to an instruction before the called world switch instruction when an interrupt occurs while the computing system is in the high security environment.

18. The method as claimed in claim 17, further comprising:
forwarding the pseudo normal thread to the thread ordering service again after the normal ISR; and
resuming the pseudo normal thread to repeat the world switch instruction to resume the secure thread when the pseudo normal thread gains access to resources of the computing system again in the thread ordering service.

19. A computing system provides normal security services and high security services with a single operating system, comprising:
normal devices and secure devices, wherein part of the secure devices are dedicated for the high security services; and
a processor, building an operating core switched between a normal state and secure state via a thread ordering service and a monitor,
wherein:
the operating core built by the processor accesses the normal devices when being in the normal state, to form a normal security environment by the computing system for the normal security services;
the operating core built by the processor accesses the secure devices when being in the secure state, to form a high security environment by the computing system for the high security services;
the thread ordering service schedules resources to queued normal threads and a pseudo normal thread, wherein the pseudo normal thread is executed while the computing system is in the normal security environment and the pseudo normal thread is a temporary of a secure thread only accessible while the computing system is in the high security environment;
the monitor is activated by a world switch instruction when the pseudo normal thread gains access to the resources, to save context of the pseudo normal thread, change the computing system to the high security environment, obtain the secure thread corresponding to the pseudo normal thread, and dispatch the secure thread to be executed by the computing system that has been changed to the high security environment,
wherein the pseudo normal thread has a one-to-one relation with the secure thread and is a substitute of the corresponding secure thread to queue with other normal threads for accessing the resources.

20. The computing system as claimed in claim 19, wherein:
the monitor is further activated by a world switch instruction from the high security environment to save context of the secure thread, change the computing system to the normal security environment, obtain the pseudo normal thread, restore the context of the pseudo normal thread, and return to the normal security environment.

* * * * *